United States Patent

Rothrock et al.

[15] 3,639,065
[45] Feb. 1, 1972

[54] MONITOR FOR LASER OPTICAL PUMPING MEANS

[72] Inventors: Larry R. Rothrock, Poway; Raymond E. Wilder, Escondido, both of Calif.

[73] Assignee: Union Carbide Corporation, New York, N.Y.

[22] Filed: June 27, 1969

[21] Appl. No.: 837,079

[52] U.S. Cl. ............................................................356/225
[51] Int. Cl. ..............................................................G01j 1/42
[58] Field of Search ...................356/225; 250/71, 83.3 IR; 331/94.5

[56] References Cited

UNITED STATES PATENTS 3,142,755  7/1964  Leroux .................................250/71
3,109,094  10/1963  Marshall et al. ......................250/71

Primary Examiner—Ronald L. Wibert
Assistant Examiner—Conrad Clark
Attorney—Paul A. Rose, Thomas I. O'Brien, Leo A. Plum and Harrie M. Humphreys

[57] ABSTRACT

A device for monitoring the output of optical pumping means of laser devices in the light frequency regions useful in pumping the laser material which comprises a sample of laser material between two light filters. The first filter passes all frequencies except the laser material fluorescent frequency while the second filter passes only the laser fluorescent frequency. The intensity of fluorescent light passing through the second filter is detected and provides a measure of the useful output of the pumping means.

6 Claims, 1 Drawing Figure

PATENTED FEB 1 1972
3,639,065
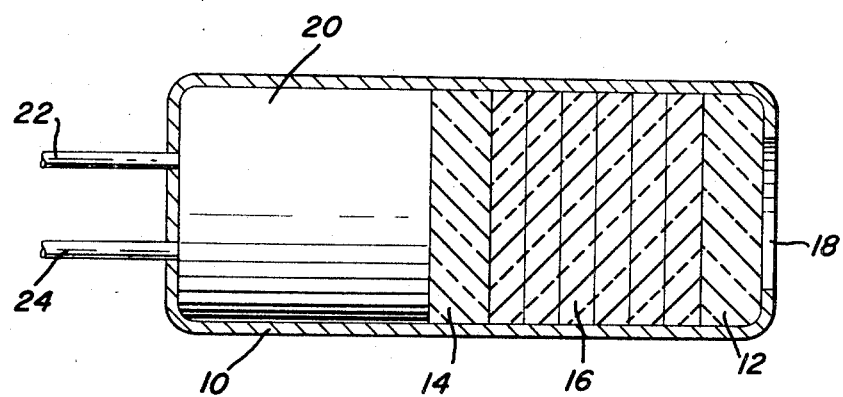
INVENTORS
LARRY R. ROTHROCK
RAYMOND E. WILDER
BY
ATTORNEY 3,639,065

MONITOR FOR LASER OPTICAL PUMPING MEANS

BACKGROUND

This invention relates to laser pumping means monitors. More particularly, the invention is directed to a method and apparatus for monitoring the useful energy output of optical pumping means for lasers.

Optically pumped laser devices have been known for a number of years and a variety of apparatus has been developed for providing the light necessary to pump the laser material.

Optical pumping devices for lasers often have a tendency to lose their efficiency during usage with a corresponding decrease in the efficiency of operation of the laser device. For example, in a flashlamp, such as a xenon flashlamp, the input of a certain quantity of electrical energy into flashlamp results in production of a quantity of light from the flashlamp, some of which is helpful in pumping the laser material. With continued use, the light output of the flashlamp (for the same quantity of electrical energy input) tends to decrease. Accordingly, some means is desirable for monitoring the output of the flashlamp so that, when the useful light output of the flashlamp drops below the point wherein the laser is pumped efficiently, the flashlamp can be replaced or, alternatively, a larger electrical input can be supplied to the flashlamp so that its light output will again reach useful levels.

Devices heretofore used as monitors for optical pumping means, for example, conventional photodetectors, measured only the total light output and could not distinguish or monitor the output of those frequency ranges of the light which are useful in pumping the laser material.

The method and apparatus of this invention also make it possible to measure directly the useful pumping energy output from the optical pumping device which was not possible heretofore. For example, a previously known method for measuring the output of a flashlamp was to determine the quantity of electrical energy discharged through the flashlamp. However, there was often not a direct and predictable relationship between energy discharged through the flashlamp and the portion of the flashlamp output which actually contributed to pumping of the laser device.

SUMMARY OF THE INVENTION

The invention includes a process for monitoring the output of an optical pumping means used for pumping the solid or liquid active material of an optically pumped laser device which comprises the steps of:
1. passing light from the optical pumping means through a first filter which is transparent to substantially all frequencies of light except the fluorescent frequency of the laser material;
2. passing light transmitted by the first filter into a sample of active laser material which is the same as the active material of the laser device;
3. passing light emerging from the sample of active material through a second filter which is transparent to substantially only the fluorescent frequency of the active material; and
4. determining the intensity of the light transmitted by the second filter.

The invention also includes apparatus for monitoring the output of an optical pumping means used for pumping the solid or liquid active material of an optically pumped laser device which comprises:
1. a sample of active laser material which is the same as the active material of the laser device:
2. a first filter, disposed between the sample of active material and the optical pumping means, which is transparent to substantially all frequencies of light except the fluorescent frequency of the active material;
3. a second filter, disposed on the opposite side of the sample of active material from the first filter, which is transparent to substantially only the fluorescent frequency of the active material; and
4. means for detecting and determining the intensity of light transmitted by the second filter.

THE DRAWINGS

In the drawings:
The single FIGURE is a schematic representation of one embodiment of the apparatus of this invention.

DETAILED DESCRIPTION OF THE INVENTION

In a preferred form of the apparatus of this invention, the sample of active laser material is disposed between the two filters and is in contact therewith; and the two filters, laser material, and means for detecting the transmitted light are enclosed in a suitable container which is lighttight, except for the exposed surface of the first filter which faces the optical pumping means.

The term "fluorescent frequency of the laser material," as used herein, means the frequency of light emitted by the active laser material as the result of atomic transitions between the same two energy states which are utilized when the material functions as a laser. Thus the "fluorescent frequency of the laser material" is substantially identical with the frequency of the coherent light emitted by the active material of the laser when it functions as a laser.

The term "optical pumping means," as used herein, means any apparatus for providing energy in the frequency range necessary for pumping the active medium of an optionally pumped laser device, and includes, for example, flashlamps, filament lamps, electric arcs and other laser devices (whose output is used to pump a second laser).

One embodiment of the apparatus of this invention is shown in the drawing. In the drawing, 10 is a lighttight enclosure, suitable constructed from an opaque material such as metal or ceramic. Two filters, 12 and 14, and a sample of laser material 16 are enclosed within container 10. The container has an opening 18 so that light can reach the surface of filter 12. Active material 16 is a sample of the same material as is employed in the optically pumped laser device (not shown). The optical pumping means (not shown) for the laser device is monitored by the apparatus shown in the drawing. The filter 12 is transparent to substantially all wavelengths of light except the narrow band of frequencies which encompasses the fluorescent frequency of the active laser material. Filter 14, on the other hand, is opaque to substantially all frequencies of light except the narrow band which includes the fluorescent frequency of the active laser material. Optical filters suitable for use as elements 12 and 14 are well known and are available in many sizes and shapes and with many combinations of both transmitted frequencies and nontransmitted frequencies. Such optical filters can be solid, such as dielectric filters, or liquids, such as solutions of light absorbing materials.

Means 20 for detecting and measuring the light transmitted by filter 14 is disposed within container 10 and can be, for example, a conventional photodetector such as phototubes, photodiodes, or PIN-junction diodes. Suitable leads, 22 and 24, are provided for carrying the signal from the photodetector to a suitable display device, such as a volt meter or an oscilloscope.

In practice, the container 10 is disposed in the laser device in a position such that some of the output of the optical pumping device impinges upon the surface of filter 12 through opening 18. Filter 12 passes substantially all of the light impinging on its surface, except the narrow band of frequencies corresponding to the fluorescent frequency of the laser material. The transmitted light then enters the sample of active material 16 where some of the light is absorbed in the same manner as the pumping light striking the laser material itself, and is reemitted as light having the frequency of the laser fluorescent frequency. Light having the frequency of the fluorescent frequency then passes through filter 14 into the photodetector 20 while light of substantially all other frequencies is blocked by filter 14. The intensity of the light which passes into the detector is displayed by the detector as, for example, a voltage reading on a volt meter or as a trace on an oscilloscope screen.

In constructing the apparatus of this invention, the actual sizes of the various components are not critical. The main consideration is to select components which are relatively small and, therefore, relatively light weight and easy to mount on the laser devices. Filters and photodetectors are available in a variety of sizes and shapes. The sample of active laser material can have a variety of shapes, preferably a shape which is compatible with the shape of the filters. Samples of solid active material in the form of short, cylindrical rods have been used successfully with disc-shaped solid filters, and such cylindrical rods of active material have varied in thickness from 0.2 cm. to 1.0 cm. Samples of liquid active materials can be enclosed in short cylindrical transparent containers such as the cells (cuvettes) conventionally used for liquid samples in spectrophotometers. In general, the combination of active material sample and two filters should be made as thin as possible (commensurate with adequate physical strength) so that the path traveled by light passing through the apparatus of this invention will be relatively short.

In addition to enclosing the sample of active material, filters, and photodetector in a lighttight container, it is also preferable to reduce as much as possible the leakage of light around one or more of the filters or the sample of active medium and into the photodetector. That is, best results are obtained when the only light which reaches the photodetector is light which has passed through both of the filters and the sample of active material. Leakage of light can be prevented by conventional means, for example by coating the periphery of the elements of the apparatus of this invention with pitch, black electrical tape, and the like.

When the relative positions of the monitor and the optical pumping means remain substantially constant, the monitor can be used to follow the useful energy output of the pumping means. For example, the output of a flashlamp may decrease due to a deterioration of the flashlamp, dulling of the reflector portions of the laser cavity, or other reasons. When the flashlamp output drops below a certain level, the flashlamp can be replaced or the electrical energy supplied to the flashlamp can be increased in order to maintain the flashlamp output at a useful level.

The method and apparatus of this invention can be used in connection with any laser device which employs a solid or liquid optically pumped active medium, for example, chromium doped corundum (ruby), yttrium aluminum garnet doped with neodymium or other rare earths, calcium tungstate doped with neodymium, yttrium oxide doped with neodymium or other rare earths, erbium oxide doped with holmium, glass containing neodymium, liquid selenium oxychloride containing neodymium ions, and the like.

In practice, the monitor of this invention can be permanently attached to the laser device to provide constant monitoring of the optical pumping means output, or the monitor can be removably mounted on the laser device so that a single monitor can be used to make periodic checks of pumping means output for two or more laser devices.

The monitor of this invention generally receives only a portion of the light output of the optical pumping means and the absolute magnitude of this portion is often difficult to measure exactly. Accordingly, the monitor of this invention normally registers and displays an intensity of light which is proportional to total pumping means output and such display is most conveniently made in arbitrary units such as volts (where a voltmeter is the display device) or in units which correspond to the units on an oscilloscope screen. However, tests of the monitor of this invention have shown that the laser output is directly proportional to the intensity (in arbitrary units) of the useful pumping means output which is measured by the monitor. Of course, the monitor of this invention can be calibrated to yield readings of absolute values of light intensity, as well as arbitrary intensity units.

The following example further illustrates the method and apparatus of this invention:

EXAMPLE

In this example a monitor apparatus of this invention was used to measure the output of a xenon flashlamp which formed part of a conventional ruby laser device. The active material used in this laser was a cylindrical crystal of ruby containing 0.05 weight percent $Cr_2O_3$. The fluorescent frequency of the active material was 6943 A.

The flashlamp monitor employed a phototube as the detector device. A multilayer dielectric filter having a narrow band pass at 6,943 A. was attached directly to the face of the phototube. To the other side of this filter was attached a cylindrical sample of ruby (containing 0.05 weight percent $Cr_2O_3$) which was one-half inch in diameter and 1 centimeter long and which had polished end faces. To the other end face of the ruby sample was attached a second multilayer dielectric filter which blocked 6,943 A. of radiation but transmitted substantially all other wave lengths. The combination of phototube, filters and ruby sample were provided with an opaque coating to prevent extraneous light from reaching the phototube. The monitor was placed against a one-fourth inch diameter hole drilled in the flashlamp cover of the laser head, the hole being positioned in such a way that a portion of the light emitted from the flashlamp could pass through the hole and enter the monitor through the 6,943 A. blocking filter. The phototube was appropriately biased and the phototube output was displayed on an oscilloscope and measured in volts.

The laser device was then operated for a series of 12 shots, and for each of the 12 shots the following three quantities were measured: (a) the electrical energy discharged through the flashlamp, (b) the output of the ruby laser, and (c) the useable optical energy put out by the flashlamp as measured by the flashlamp monitor. The first few laser shots gave scattered results because the reflectors in the laser cavity had not stabilized. However, the reflectors stabilized after the first four shots and remained so for the remainder of the series of 12 shots.

During the final eight shots the laser output varied from about 0.5 to 30 joules, the electrical energy discharged through the flashlamp varied from 3.5 to 10 kilojoules, and the useable optical energy measured by the flashlamp monitor of this invention varied from 0.1 to 0.44 volts.

For the last eight shots in the series of 12 shots, the laser output was directly proportional to the useable optical energy measured by the flashlamp monitor of this invention, as evidenced by the linear relationship between laser output and useable optical energy over the entire range. On the other hand, the plot of electrical energy input versus useable optical energy measured by the monitor of this invention showed a linear relationship over only part of the total range, and deviated substantially from linearity for energy inputs below 5 kilojoules.

We claim:
1. A process for monitoring the output of an optical pumping means used for pumping the solid or liquid active material of an optically pumped laser device which comprises the steps of:
   1. passing light from said optical means through a first filter which is transparent to substantially all frequencies of light except the fluorescent frequency of said laser material;
   2. passing light transmitted by said first filter into a sample of active laser material which is the same as, but separate from, the active material of said laser device;
   3. passing light emerging from said sample of active material through a second filter which is transparent to substantially only the fluorescent frequency of said active material; and
   4. determining the intensity of the light transmitted by said second filter.

2. Apparatus for monitoring the output of an optical pumping means used for pumping the solid or liquid active material of an optically pumped laser device which comprises:
   1. a sample of active laser material which is the same as, but separate from, the active material of said laser device;

2. a first filter, disposed between said sample of active material and said optical pumping means, which is transparent to substantially all frequencies of light except the fluorescent frequency of said active material;
3. a second filter, disposed on the opposite side of said sample of active material from said first filter, which is transparent to substantially only the fluorescent frequency of said active material; and
4. means for detecting and determining the intensity of light transmitted by said second filter.

3. Apparatus in accordance with claim 2 wherein said active material is a solid.

4. Apparatus in accordance with claim 3 wherein said active material is ruby.

5. Apparatus in accordance with claim 2 wherein said filters are solid dielectric filters.

6. Apparatus in accordance with claim 2 wherein said optical pumping means is a flashlamp.

* * * * *